United States Patent
Hicks (10) Patent No.: US 6,654,954 B1
(45) Date of Patent: Nov. 25, 2003

(54) COMPUTER SYSTEM, PROGRAM PRODUCT AND METHOD UTILIZING EXECUTABLE FILE WITH ALTERNATE PROGRAM CODE ATTACHED AS A FILE ATTRIBUTE

(75) Inventor: Daniel Rodman Hicks, Byron, MN (US)

(73) Assignee: International Business Machines Corporation, Armonk, NY (US)

(*) Notice: Subject to any disclaimer, the term of this patent is extended or adjusted under 35 U.S.C. 154(b) by 780 days.

(21) Appl. No.: 09/024,111

(22) Filed: Feb. 17, 1998

(51) Int. Cl.[7] .................................................. G06F 9/45
(52) U.S. Cl. ........................................ 717/162; 707/203
(58) Field of Search ........................... 395/709; 717/9, 717/162, 203

(56) References Cited

U.S. PATENT DOCUMENTS

| | | | | |
|---|---|---|---|---|
| 5,047,918 A | * | 9/1991 | Schwartz et al. | 707/203 |
| 5,590,331 A | * | 12/1996 | Lewis et al. | 395/708 |
| 5,768,593 A | * | 6/1998 | Walters et al. | 395/705 |
| 5,819,275 A | * | 10/1998 | Badger et al. | 707/100 |
| 5,854,932 A | * | 12/1998 | Mariani et al. | 395/709 |
| 5,878,262 A | * | 3/1999 | Shoumura et al. | 375/710 |
| 5,905,895 A | * | 5/1999 | Halter | 395/709 |
| 5,966,539 A | * | 10/1999 | Srivastava | 395/709 |
| 5,978,815 A | * | 11/1999 | Cabrera et al. | 707/204 |

OTHER PUBLICATIONS

Dean et al., Vortex: an optimizing complier for object–oriented languages, Oct. 1996, p.83–100.*
Lindholm and Yellin, *The Java Virtual Machine Specification*, Addison–Wesley, pp. 83–84 (1997).
Yellin, *The JIT Compiler API*, p. 1 (1996), available at ftp://ftp.javasoft.com/jit–interface.ps.

* cited by examiner

Primary Examiner—John Chavis
(74) Attorney, Agent, or Firm—Wood, Herron & Evans, LLP; Steven W. Roth (57) ABSTRACT

A computer system, program product, and method utilize alternate program code associated with an executable file using a file attribute so that the alternate program code may be retrieved and executed in lieu of the primary program code stored in the file. As one example, for a platform-independent executable file such as a Java class file, a file attribute of the file may be analyzed to determine if native program code for a particular platform is associated with the file. If so, the native program code may be retrieved and executed directly without the additional overhead associated with interpreting the platform-independent program code in the file. If, on the other hand, the native program code is not detected, the native program code may be generated and associated with the file using a file attribute such that the native program code is detected in subsequent attempts to retrieve and execute the file.

69 Claims, 7 Drawing Sheets

COMPUTER SYSTEM, PROGRAM PRODUCT AND METHOD UTILIZING EXECUTABLE FILE WITH ALTERNATE PROGRAM CODE ATTACHED AS A FILE ATTRIBUTE

FIELD OF THE INVENTION

The invention is generally related to computers and computer software. More specifically, the invention is generally related to optimizing retrieval and execution of executable files on a computer system.

BACKGROUND OF THE INVENTION

Computer technology continues to be applied to new applications to handle more useful and complex tasks. Despite the continual advances in the speed and power of computers, however, these new applications of computer technology continue to demand even greater computing power. For this reason, an ever-present need exists for improving the performance of the computer software that controls how a computer operates.

It has been found that the greatest performance can typically be obtained using computer software formatted in a native language for a particular computer's hardware. Specifically, all computers include at the most basic level one or more processors that process sequences of instructions (known as program code) that are formatted in a specific language that is directly understood by the processors. If it is desired to execute program code that is written in another language, that program code must first be translated into native format understood by the particular processor.

Computer software is typically written in a human-readable format known as source code. If the source code is written in a compiled language such as c or c++, the source code may be translated, or compiled, into native machine-readable program code using a computer program called a compiler. The compiled source code, often referred to as object code, may also be optimized using various compilation techniques. The compilation process is typically tailored for a particular computer hardware configuration, known as a platform, so that the resulting object code is native to the platform for optimum performance. As a result, compiled object code is often limited to execution on a single computer platform.

While object code from a compiled language is typically compiled prior to execution on a computer, it is also possible to perform dynamic translation of source code during program code execution using a process called interpretation, e.g., as found with interpretative computer languages such as basic. However, translating program code from one format to another can significantly affect the performance of a computer due to the additional processing that is required to perform the translation process before program code can be executed. As a result, interpretative program code is often not a viable option for many performance-critical applications.

Due to the growing popularity of the Internet, and of networking in general, computers of all types and from all over the world are being interconnected together, in part to permit program code to be distributed and used on different computers. However, due to differences between the hardware configurations of different computers, it is often difficult to distribute compiled program code to a specific computer—especially when the sending computer is not aware of the particular platform of the destination computer.

It would be desirable in many situations to be able to distribute and execute computer software on any computer regardless of its particular platform. As a result, computer software languages such as Java have been developed that attempt to partially bridge the gap between purely interpretative and compiled languages by producing program code that is "platform independent" and can be executed on a wide variety of computer platforms.

With Java, for example, source code is compiled into sequences of bytecodes, stored in class files, that are formatted in a language that is native to a "virtual" platform or machine. To execute compiled Java program code on a specific computer platform, a Java Virtual Machine (JVM) computer program (which includes a Java interpreter) is required to dynamically translate the platform-independent program code in class files into native program code for the platform. Thus, as long as a computer has a suitable JVM for its particular platform, the computer can execute a Java program.

While the performance of Java program code is often superior to that of a purely interpretative language, the performance often significantly lags that of a compiled language since translation of Java bytecodes into native program code is still required at run-time. While Java is capable of directly calling relatively faster native methods in a computer, the use of such methods often destroys platform-independence, and is thus unsuitable for use in many applications.

Significant development efforts have been expended in the area of "just-in-time" compilation, where Java bytecodes are compiled into native piogram code when they are first loaded into a computer, and then are maintained in the computer memory during run-time so that subsequent execution is performed principally using native program code. However, just-in-time compilers often produce poor program code since they operate on Java bytecodes only after a class file is loaded, and thus must compile quickly so as to avoid excessive delay in the loading operation.

Another manner of increasing performance with a platform-independent language is the use of a "fat" file that allows pre-compiled native p gram code to be stored along with a file containing platform-independent program code. For example, with a Java fat file, native program code corresponding to a Java class may be stored at the end of a class file. Detection of the existence of this program code is performed by determining if the actual length of the file is greater than the length indicated in the file header. Thus, if native program code is detected, the native version of the program code may be executed in lieu of the platform-independent version, often with improved performance.

However, incorporating native and platform-independent program code using a fat file requires modification of the original platform-independent file. Consequently, there is a risk that the file will lose its platform-independence and fail to execute properly on other platforms. Moreover, to create a fat file a user must be granted write access to the original file, which may not be practical or advisable in many situations. Compilation must also be performed as an explicit step requiring explicit actions by the user, and as a result, dynamically transmitted files often may never be capable of benefitting from the potential performance improvements of pre-compilation. complilation, In addition, the integrity checking (if any) of the file during runtime is often insufficient, and a risk exists that the file may be damaged during an update or that the native program code may be out of date if it was not also up dated in response to an update of the platform-independent program code in the file.

Consequently, a significant need continues to exist for a manner of improving the performance of computer software program code. Moreover, with respect to platform-independent languages such as Java, a significant need continues to exist for a manner of improving performance without sacrificing platform-independence.

SUMMARY OF THE INVENTION

The invention addresses these and other problems associated with the prior art by providing a computer system, program product, and method in which alternate program code is associated with an executable file using a file attribute so that the alternate program code may be retrieved and executed in appropriate circumstances. A file attribute may include practically any parameter associated with a file other than its actual contents. File attributes are conventionally utilized by file management systems to store information about files, e.g., creation date, last date modified, access rights, descriptions or alternate names, etc. File attributes are typically handled separately by a file management system, and cannot be updated directly by modifying the contents of the files—that is, file attributes are often hidden from normal file input/output operations.

By associating alternate program code with an executable file using a file attribute, the alternate program code is more transparent to the user, as well as to conventional execution modules that are not specifically configured to detect and execute the alternate program code. Moreover, system write access is often not required for a user, so that the integrity of the original executable program code can be protected.

While the invention may be used to improve performance in a wide variety of other applications, one important application of the invention is in associating native program code with an executable file containing platform-independent program code, e.g., a Java class file. Given that program code associated with a file attribute is typically transparent to conventional Java interpreters, the performance of a Java or other platform-independent computer program may be enhanced for operation on a particular platform while maintaining platform-independence.

An executable file is generally considered to include a first set of program code. Consistent with one aspect of the invention, a computer system, program product, and method may be provided where such a file is retrieved, a second set of program code is generated from the first set of program code, and the second set of program code is associated with the file using a file attribute. Consistent with another aspect of the invention, a computer system, program product, and method may be provided where a file attribute of such a file may be analyzed to detect existence of the second set of program code so that the second set of program code may be retrieved.

These and other advantages and features, which characterize the invention, are set forth in the claims annexed hereto and forming a further part hereof. However, for a better understanding of the invention, and of the advantages and objectives attained through its use, reference should be made to the Drawing, and to the accompanying descriptive matter, in which there is described exemplary embodiments of the invention.

DETAILED DESCRIPTION

Hardware Environment

Figure 1:
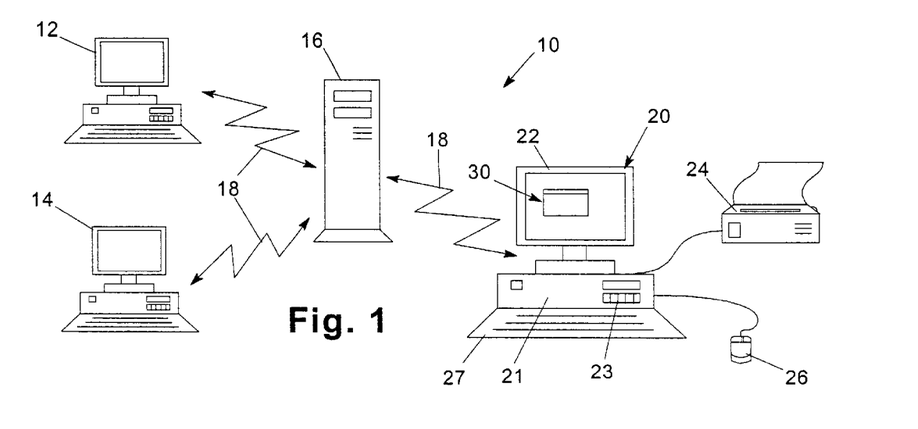
FIG. 1 is a block diagram of a computer system consistent with the invention.

Turning to the Drawing, wherein like numbers denote like parts throughout the several views, a computer system 10 consistent with the invention is illustrated in FIG. 1. Computer system 16 is illustrated as a networked computer system including one or more client computer systems 12, 14 and 20 (e.g., desktop or personal computers, workstations, etc.) coupled to server system 16 through a network 18. Network 18 may represent practically any type of networked interconnection, including but not limited to local-area, wide-area, wireless, and public networks (e.g., the Internet). Moreover, any number of computers and other devices may be networked through network 18, e.g., multiple servers. Furthermore, it should be appreciated that the principles of the invention may be utilized as well by stand-alone computers and associated devices consistent with the invention.

Computer system 20, which may be similar to computer systems 12, 14, may include one or more processors such as a microprocessor 21; a number of peripheral components such as a computer display 22 (e.g., a CRT, an LCD display or other display device); storage devices 23 such as hard, floppy, and/or CD-ROM disk drives; a printer 24; and various input devices (e.g., a mouse 26 and keyboard 27), among others. Computer system 20 operates under the control of an operating system, and executes various computer software applications, programs, objects, modules, etc. Moreover, various applications, programs, objects, modules, etc. may also execute on one or more processors in server 16 or other computer systems 12, 14, e.g., in a distributed computing environment.

In general, the routines executed to implement the illustrated embodiments of the invention, whether implemented as part of an operating system or a specific application, program, object, module or sequence of instructions will be referred to herein as "computer programs". The computer programs typically comprise instructions which, when read and executed by one or more processors in the devices or systems in networked computer system 10, cause those devices or systems to perform the steps necessary to execute steps or elements embodying the various aspects of the invention. Moreover, while the invention has and hereinafter will be described in the context of fully functioning computer systems, those skilled in the art will appreciate that the various embodiments of the invention are capable of being distributed as a program product in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, among others and transmission type media such as digital and analog communications links.

Those skilled in the art will recognize that the exemplary environment illustrated in FIG. 1 is not intended to limit the present invention. Indeed, those skilled in the art will recognize that other alternative hardware environments may be used without departing from the scope of the invention.

Software Environment

Figure 2:
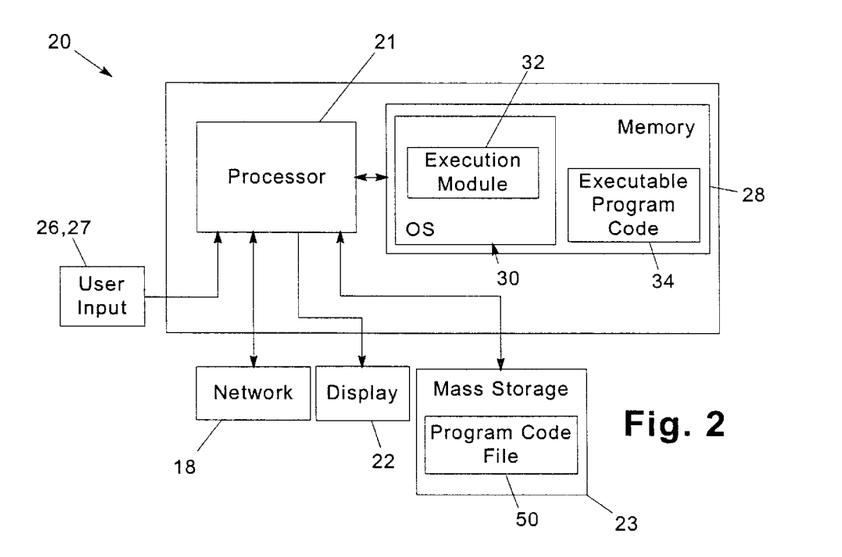
FIG. 2 is a block diagram of an exemplary software environment for the computer system of FIG. 1.

FIG. 2 illustrates one suitable software environment for computer system 20 consistent with the invention. A processor 21 is illustrated as coupled to a memory 28 as well as to several inputs and outputs. For example, user input is received by processor 21, e.g., by mouse 26 and keyboard 27, among others. Additional information may be passed between computer system 20 and other computer systems in networked computer system 10 via network 18. Additional information may be stored to and/or received from mass storage 23. Processor 21 also outputs display data to display 22. It should be appreciated that computer system 20 includes suitable interfaces between processor 21 and each of components 18, 22, 23, 26, 27 and 28 as is well known in the art.

An operating system 30 is illustrated as resident in memory 28, and executing within this operating system is illustrated an execution module 32 that is configured to execute program code on processor 21, e.g., executable program code 34, as well as to retrieve program code such as program code file 50 from mass storage 23 and/or network 18, among other operations. Execution module 32 may also, in the alternative, be implemented as a separate application that executes on top of an operating system. Furthermore, it should be appreciated that any of execution module 32, executable program code 34, and program code file 50 may, at different times, be resident in whole or in part in any of memory 28, mass storage 23, network 18, or within registers and/or caches in processor 21.

It should be appreciated that other software environments may be utilized in the alternative.

Figure 3:
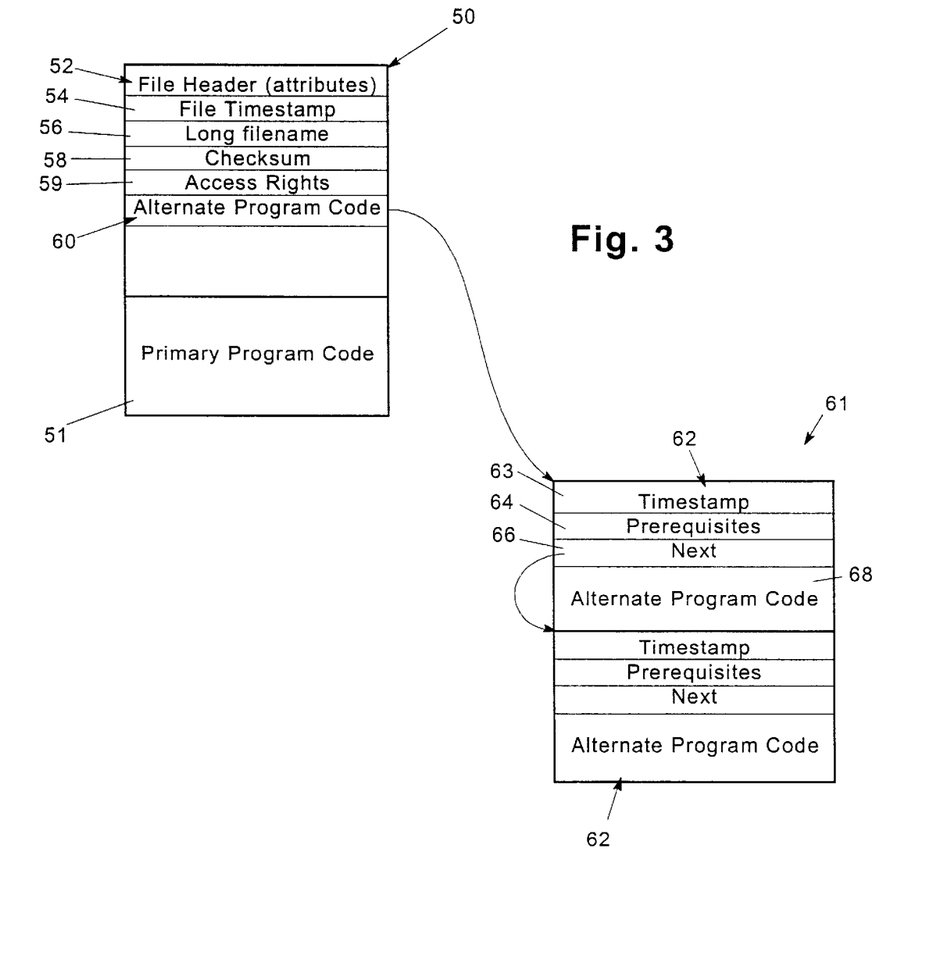
FIG. 3 is a block diagram of a program code file consistent with the invention.

Executable File With Alternate Program Code Associated Therewith Using a File Attribute FIG. 3 illustrates an executable or program code file 50 consistent with the invention. File 50 may be primarily partitioned into file contents and file attributes, with the file contents represented by a set of primary program code 51, and with the file attributes being maintained in a file header 52 preceding the program code.

In general, the file contents for any executable file include the program code that is to be executed on the computer system when the file is run. The program code may take any number of forms, typically depending upon the execution module upon which the program code is executed. For example, the program code may be native program code that includes a sequence of instructions that are directly executable by the processor for a computer system, e.g., object code compiled from languages such as c and c++, among others. Program code may also be native program code for another type of processor that is translated into native program code for the executing computer system by an emulation program, e.g., for executing Intel x86 program code on a PowerPC processor in an RS/6000 AIX system from International Business Machines Corporation, among others. Program code may also include non-native program code such as interpreted program code that is converted into native program code during runtime, including source (human-readable) code and script program code written in a scripting language, among others. While the invention is not limited as such, one specific example of program code discussed herein is Java program code, which includes a sequence of bytecodes that are in effect native to a "virtual machine" emulated by an interpreter execution module that runs on a computer system.

File attributes, on the other hand, generally include much of the "overhead" information in a file that is provided and used primarily for file management purposes. File attributes are typically not accessed directly during content access operations—that is, the attributes are typically hidden from access by normal file input/output operations provided in a computer system such as load and save operations. Instead, file attributes are typically accessed and/or modified, if at all, by a file management system as an ancillary process when it is necessary to obtain and/or modify particular status information or other characteristics of a file.

For example, many file management systems store and access file attributes in a file such as the data a file was created, the date a file was last modified (often referred to as a "timestamp"), checksum and/or error correction data, and/or the access rights to the file (e.g., read-only, hidden, archived, compressed, system, etc.), creation date, last date modified, access rights, descriptions or alternate names, etc. Moreover, other information specific to a file management and/or an operating system may be maintained, e.g., the alternate or long filenames supplied as file attributes in the OS/2 and Windows 95 operating systems available respectively from International Business Machines Corporation and Microsoft Corporation.

Practically every operating and file management system therefor utilizes at least a few file attributes to store status information regarding individual files. The OS/2 and Windows 95 operating systems, for example, permit unlimited attributes to be attached to a file. Other operating systems, e.g., the OS/400 operating system from International Business Machines Corporation, treat files at a low level as objects that can have fields in addition to object (or file) data, whereby file attributes are stored in specific fields within the files.

For file 50 in FIG. 3, for example, several commonly-used file attributes are illustrated, including file timestamp 54, long filename 56, checksum 58 and access rights 59. It should be appreciated that the attributes illustrated for file 50 are merely exemplary in nature, and that any number, ordering and/or types of file attributes may be utilized by a file management system consistent with the invention.

Preferred embodiments of the invention operate by associating alternate program code with an executable file using a file attribute for the file. As a result, the alternate program code is often transparent to the user, as well as to conventional execution modules that are not specifically configured to detect and execute the alternate program code. Such conventional execution modules therefore often handle a modified file in an identical manner as the file was handled thereby prior to the modification, and thus backward compatibility therewith is typically maintained. For example, with native program code associated with a file attribute to a computer program such as a Java class file having a sequence of platform-independent bytecodes as the primary program code therefor, the native code is typically transparent to conventional Java interpreters. When the same file is handled by an execution module consistent with the invention, however, the performance of the Java computer program may be enhanced for operation on the particular platform to which the associated program code is native. As a result, performance enhancements on specific platforms are provided without sacrificing overall platform-independence.

It is possible consistent with the invention to associate alternate program code with primary program code by storing the alternate program code directly in the file header. However, one preferred implementation of the invention utilizes alternate program code stored in a separate file and linked to the primary program code file via a file attribute—typically incorporating a reference (e.g., a pointer, name, address, or other identifying information) for the alternate program code file as the file attribute. By associating program code via linking a separate file to a primary program code file, the changes required to an operating system or other applications which utilize such programs are minimized. Moreover, given the generally unpredictable size of the alternate program code and the fact that such code is typically generated after the primary program code, it would be difficult, though not impossible, to efficiently allocate space for alternate program code within a physically contiguous file that contains the primary program code as its last element.

Typically, the header (or file attribute) portion of a file is of fixed length, and often precedes the content data of the file. Attributes are typically implemented either as a limited number of fixed-length fields, or implemented in a separate area. In the OS/2 operating system, for example, attributes are named data strings that are stored, conceptually or physically, in the file directory as a part of the directory entry for the file. In such a case, one preferred manner of associating alternate program code with a primary program code file is to insert into the directory entry for the primary program code file an attribute containing the name of another file including the alternate program code and its associated data. With other operating systems such as the OS/400 operating system, a file header typically includes some space that is primarily reserved for attributes that have not been defined. Thus, for such operating systems one preferred manner of associating alternate program code with a primary program code file is to define a portion of the reserved space in the header for the primary program code file as a pointer to the storage area that contains a file with the alternate program code and its associated data.

For example, as shown in FIG. 3, alternate program code may be stored in a file 61 that is linked to file 50 via a file attribute 60. While only one set of alternate program code may be used in a file consistent with the invention, it is also possible, as illustrated by the multiple records 62 in file 61, for multiple sets of alternate program code to be provided in a file, whereby greater flexibility is often provided.

Each record 62 includes a timestamp field 63, a prerequisites field 64, a next field 66 and the actual program code, stored in field 68. It should be appreciated that each of fields 63, 64, and 66 is optional, and that other information may also be stored in a record consistent with the invention.

The timestamp field 63 may be used to compare the revision status of the alternate program code with that of the file itself, and thus, that of the primary program code therein. Field 63 may therefore include an indication of the date and/or time when the program code was last stored or updated, or in the alternative, may include other revision history information such as a revision number, or version identifier. It should be appreciated that, for example, with the alternate program code being transparent to some conventional execution modules, the possibility exists that the primary program code may be updated without also updating the alternate program code. Thus, by accessing the timestamp stored in field 63, this condition may be detected so that the alternate program code may be updated, discarded or otherwise ignored if it is not current.

A number of alternate manners of detecting whether alternate program code is current may also be used. For example, in cases where a checksum is naturally stored with a file (e.g., with ZIP and JAR files, among others), the checksum of the primary program code file may be stored as a field in each record 62, so that the checksum may be compared with that stored in the primary program code file (file attribute 58). Also, it may be possible to use a separate update attribute in the primary program code file (e.g., a one-bit attribute) that is modified whenever the primary program code file is modified (e.g., by setting the attribute), and which is restored whenever the alternate program code is generated (e.g., by clearing the attribute).

The prerequisites field 64 may be used to place conditions or prerequisites upon whether the alternate program code is retrieved and/or executed in lieu of the primary program code., Field 64 may therefore include any type of information that may be used to restrict use of the alternate program code to certain environmental and/or platform conditions. For example, the decision on whether to use the primary or alternate program code, or whether to use one of several alternate program codes, may be based upon the information stored in this field. Also, the information may be used to determine whether a new version of program code should be created if the prerequisites for an existing version are not met. With languages such as Java, for example, this may permit a default compiled version of a class to be created assuming the environment of a Java Archive (JAR) file that contains the class, with a new compiled version of the class dynamically created if the actual run-time environment differs from the assumed environment for the default version. In the alternative, the prerequisites field may be omitted, with the assumption being that any alternate program code, if existing, is suitable for execution on the current platform.

As another example of the use of a prerequisites field, multiple versions of program code may be created assuming different run-time configurations, so that prerequisites associated with a list of applicable environmental assumptions made at the time each version of the program code was created may be associated with each version of program code, with the choice of which version to use made at runtime by comparing the actual environmental conditions with the environmental assumptions of each version. With languages such as Java, for example, some optimizations require knowledge of the run-time configuration of certain classes, and thus the runtime configuration assumptions may be stored as prerequisites for various optimized versions.

Moreover, it may be desirable to collect statistics over time that is used to minimize user control or interaction in tuning a computer program to a particular environment. For example, with languages such as Java, it may be desirable to collect runtime statistics for a set of classes using an interpreter or by compiling data collection hooks into the compiled Java program code, so that the information may be saved (e.g., in another attribute or elsewhere in the record) and later used in the creation of optimal alternate program code.

The next field 66 includes an index pointing to the next record 62 in the alternate program code file 61. This field is typically utilized only in implementations that support multiple sets of alternate program code so that individual records may be located within the file header. It should be appreciated, however, that other data structures for storing information in a file attribute, including pointers, arrays, linked lists, hash tables, etc. may be used store alternate program code in a file. As a result, it should further be appreciated that the data stored in field 66 may vary for different data structures.

Primary and alternate program code stored in a file consistent with the invention generally are associated with different representations of the same computer program. The representations associated with the primary and alternate program code may be distinguished in a number of manners. For example, as discussed above, primary and alternate program code may be distinguished based upon how the program code is executed, e.g., whether the program code is interpreted, compiled, scripted, etc. Such program code may also be distinguished based upon whether the code is human-readable (e.g., source code) or machine-readable (e.g., object code), or based upon the native platform therefor. Along the same lines, such program code may also be distinguished based upon whether the program code has or has not been optimized for a particular platform. As one example, for an x86 series processor from Intel Corporation, a file may be provided with MMX and non-MMX versions of the same computer program, with a suitable execution module on the computer system configured to execute the proper version based upon the processor used on a particular computer system.

Figure 4:
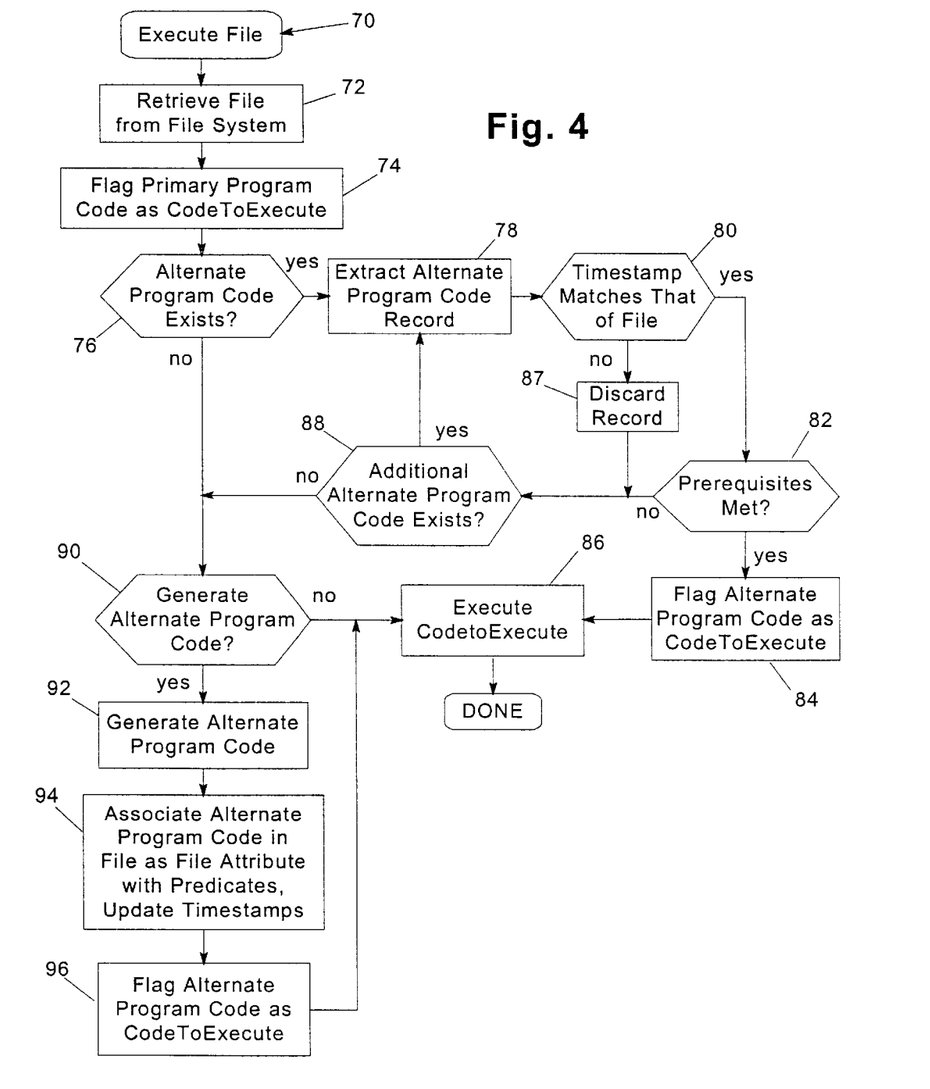
FIG. 4 is a flowchart illustrating the program flow of an execute file routine consistent with the invention.

FIG. 4 illustrates an execute file routine 70 that may be used to selectively execute one of a plurality of sets of program code in file 50 consistent with the invention. It should be appreciated that the program flow and decisions in routine 70 may be modified based upon different file formats consistent with the invention.

Routine 70 begins in block 72 by retrieving the primary program code file from the file system. It should be appreciated that retrieving a file may occur from any type of storage device, including volatile and non-volatile random access memories (RAM's), mass storage systems such as direct access storage devices (DASD's), tape drives and/or optical drives, etc., whether local to a computer system or connected thereto over a network. Moreover, it should be appreciated that block 72 may be omitted if the file is already retrieved into the workspace for a computer system.

Next, a CodeToExecute flag is set in block 74 to select the primary program code from the file as the program code to be executed, whereby, unless modified later in routine 70, ultimately results in execution of the primary program code on the computer system. It should be appreciated that the use of a flag or other variable to select program code is used herein in part for the purposes of illustration, as such a flag or variable may not be required in other implementations of the invention. For example, different program code from a file may be selected simply by taking separate program flow paths as required. Moreover, if it is desirable to always generate alternate program code if none currently exists for a file, then block 74, as well as the CodeToExecute flag and blocks 84 and 96, may be omitted.

Next, in block 76 it is determined whether alternate program code exists in the program code file, typically by determining whether a non-null filename or address pointing to an alternate program code file is stored in file attribute 60. This step may also be performed in any number of alternate manners, e.g., by testing a dedicated flag in the file attributes of the file, by searching for data within a record in an alternate program code attribute, etc.

If alternate program code is found, control passes to block 78 to extract the first alternate program code record 62 from file 61. Next, block 80 determines the revision status of the alternate program code by determining whether the timestamp stored for the alternate program code record matches that of the file (stored in file attribute 54). In the alternative, as discussed above, a checksum may be stored in record 62 and compared to that stored in attribute 58, or a separate attribute may be used to indicate a modified primary program code file.

If a match is found, control passes to block 82 to optionally determine whether the prerequisites stored in field 64 are met by the current platform and/or environmental conditions, and if so, control is passed to block 84 to update the CodeToExecute flag to select the currently-processed alternate program code as the code to be executed. Control then passes to block 86 to execute this program code in a manner suitable for the particular computer system, whereby routine 70 is then complete.

Returning to block 82, if the prerequisites are not met, control passes to block 88 to determine whether any additional alternate program code exists in the file (e.g., by determining whether a valid index is stored in next field 66, or in other manners described above with reference to block 76). Also, returning to block 80, if the record and file timestamps do not match (indicating that the alternate program code stored therein is not current), control passes to an optional block 87 that also discards the record from the file attribute, prior to passing control to block 88.

If additional alternate program code exists, block 88 passes control to block 78 to process the additional alternate program code. If not, however, control passes to block 90 to determine whether or not to generate alternate program code for the file.

Block 90 may be implemented in a number of manners. For example, block 90 may determine whether alternate program code may be generated based upon the platform and/or the current environmental conditions. Block 90 may also simply be based upon a user configurable option. In the alternative, block 90 may be omitted when it is desirable for suitable alternate program code to always be generated for the particular platform upon which routine 70 is being executed.

Block 90 may also include a heuristic that decides whether to generate alternate program code based on statistics. For example, a count of previous executions of the primary program code may be maintained so that alternate program code is created when the count exceeds a threshold, with an optional additional criteria that all prior uses occurred within a predetermined time period. A similar heuristic may be employed in block 82 to bypass sub-optimal program code and pass control to block 90 to generate optimized program code after a predetermined number of executions of the sub-optimal program code within a predetermined time period.

If block 90 determines that no program code should be generated, control passes to block 86 to execute the program code selected by the CodeToExecute flag, which, at this point, is the primary (default) program code. Routine 70 then terminates.

If, however, block 90 determines that alternate program code may or should be generated, control passes to block 92 to generate such program code. It should be appreciated that, as a result of the different possible manners of distinguishing program code consistent with the invention, the process of generating alternate program code may take one of several forms, including the assembling, compiling, translating, optimizing, inclining, scheduling, parallelizing, preparing for execution on a very large instruction word (VLIW) processor, etc. (and combinations thereof), of the primary program code.

Once the alternate program code has been generated, control passes to block 94 to associate the alternate program code with the primary program code file as a file attribute, e.g., by (if no such file exists) creating a new alternate program code file, storing a record therein with the new alternate program code, and storing the address of the new file in the appropriate file attribute for the primary program code file. If an alternate program code file currently exists, block 94 may add a record to the file (which may also require that next field 66 of the preceding record be updated, if one so exists). In addition, prerequisite information regarding the platform and/or current conditions may be stored in field 64 of the new record. Furthermore, the timestamp of the file (stored in field 54) and the record (stored in field 63) may be updated to indicate that the record includes current, and thus, valid program code.

It should be appreciated that block 94 may operate in other manners suitable for the particular data structure used for the file attribute. Moreover, in the alternative, block 94 may optionally be omitted, or may be a user-selectable option, in some implementations. For example, it may not be desirable or permitted in some applications to maintain the alternate program code, whereby only a local, volatile copy of the alternate program code is optionally maintained.

Control next passes to block 96 to set the CodeToExecute flag to select the new alternate program code as the program code to be executed. This code is then executed in block 86, whereby routine 70 is then complete.

Various modifications may be made to routine 70 consistent with the invention. For example, rather than selecting the first suitable alternate program code, the routine may be configured to analyze each available alternate program code and select the best such program code based upon the platform and/or current environmental conditions. It may also be desirable to sort alternate program codes to emphasize some versions relative to others.

Moreover, it should be appreciated that, in addition to determining which of multiple versions of a computer program to execute, other operations may be performed consistent with the invention. For example, a file including multiple sets of program code may be utilized as a master file from which only one set of program code is retrieved and/or stored in a separate file based upon the particular environmental conditions and/or platform of a target computer system. This would permit, for example, a master file to be loaded into a specific computer system or transferred from a central repository such as a file server to a specific computer system, with a local copy of the file created therefrom including only the program code appropriate for that system, and with the unused program code discarded. Moreover, the decision as to which set of program code to select may be based upon a download of only the prerequisite information for one or more versions, whereby only a file including only one specific version of program code may be downloaded based upon the environment for the target computer system.

Other modifications will be apparent to one of ordinary skill in the art.

Java Environment Implementation

While the invention should not be limited to Java and Java environments, one particularly useful embodiment of the invention, for use with a computer system such as the AS/400 computer system from International Business Machines Corporation, is described in greater detail herein. However, prior to discussing this implementation, the configuration of a conventional Java execution module is described.

Figure 5:
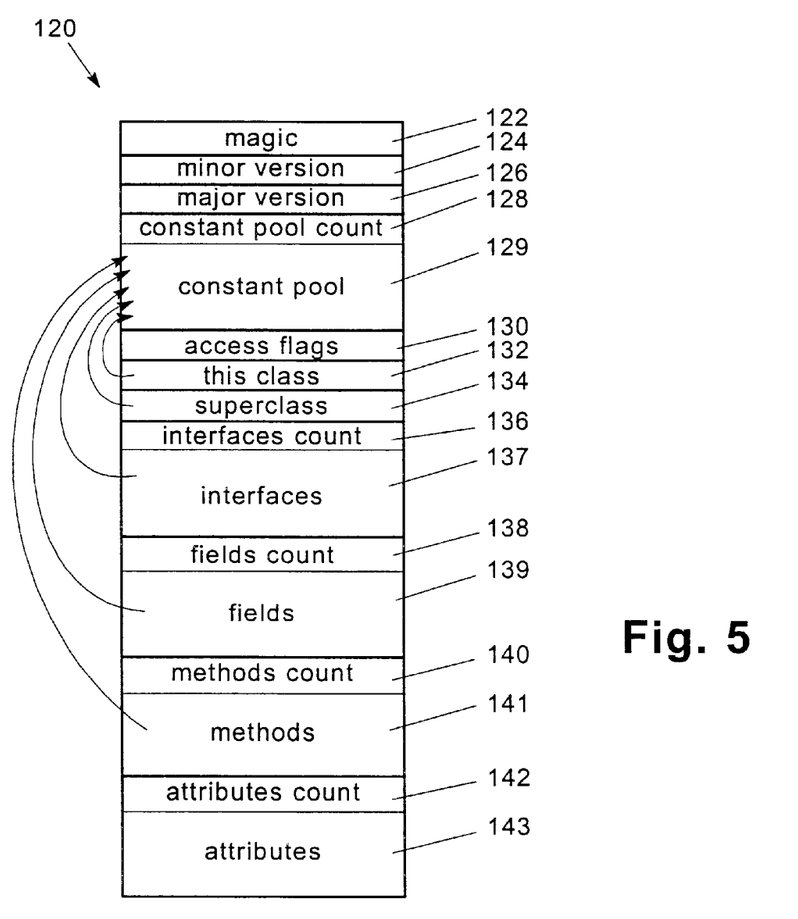
FIG. 5 is a block diagram of a conventional Java class file.

One program code file implemented in Java is a Java class file, which includes an intermediate form of program code, including a set of bytecodes, that may be executed on a "virtual machine" implemented on a particular computer platform. FIG. 5 is a diagram of the structure of a Java class file 120, as defined by The Java Virtual Machine Specification, Lindholm and Yellin, Addison-Wesley, 1997. This is the standard external representation of a Java class that enables the "portability" of Java—its ability to run on any system with a conforming Java virtual machine (JVM), regardless of the underlying architecture of the platform supporting the JVM.

Class file 120 includes a number of data fields 122–143. "Magic" data field 122 is a particular arbitrary bit sequence that allows the file to be identified as a Java class file. The bit sequence must have the value OxCAFEBABE to allow the file to be recognized as a Java class file. Also, "minor version" and "major version" data fields 124 and 126 identify the version of the class file.

"Constant pool" data field 129 defines a list of entries of varying lengths, with the size of the constant pool identified by "constant pool count" data field 128. Each entry represents a constant or external reference used elsewhere in the class file. The use of the constant pool allows a single occurrence of a value to serve multiple needs within the class file.

"Access flags" data field 130 defines some of the basic characteristics of the class represented by the class file, including the authority required to reference the class from other classes. "This class" data field 132 is an index into the constant pool of the entry that contains the name of this class, and "superclass" data field 134 is an index into the constant pool of the entry that contains the name of the superclass of this class.

"Interfaces" data field 137 defines a list of constant pool index values that identify the names of interfaces which this class implements, with the size thereof identified by "interfaces count" data field 136. Interfaces are used in Java to achieve some of the same functions that "multiple inheritance" provides in other object-oriented languages.

"Fields" data field 139 defines a list of entries of varying length which describe the fields of this class, with the size thereof identified by "fields count" data field 138. The names of the fields and, where present, their initialization values are represented as indexes into the constant pool.

"Methods" data field 141 defines a list of entries of varying length which describe the methods of this class, with the size thereof identified by "methods count" data field 140. The names of the fields are represented as indexes into the constant pool. The actual interpretable code (i.e., the set of bytecodes) for each method is appended to the end of its method entry.

"Attributes" data field 143 defines a repository for other characteristics of the class, with the size thereof identified by "attributes count" data field 142. These attributes, which are separate from the file attributes discussed herein in the context of the invention, are used to indicate Java-specific attributes for a class file, the configuration and use of which are well known in the art.

Figure 6:
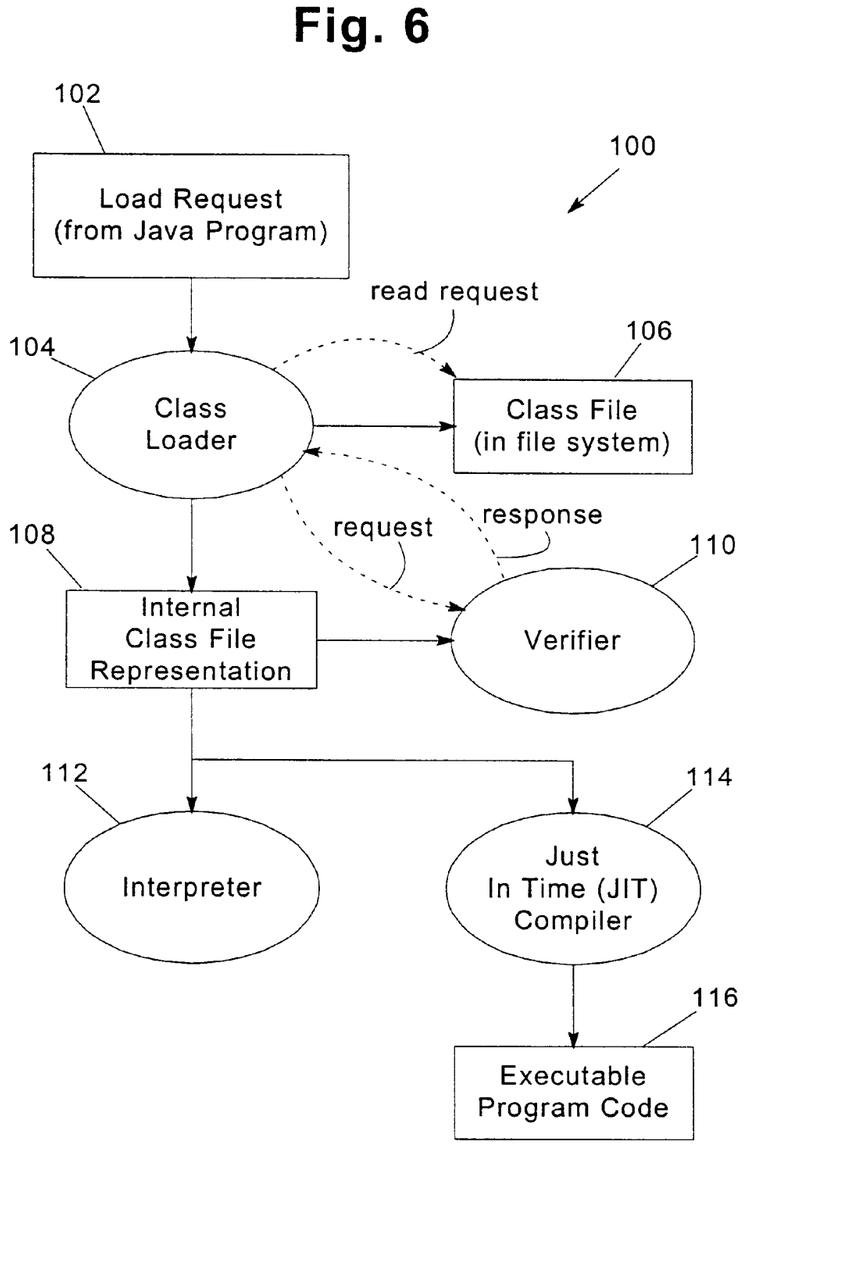
FIG. 6 is an object diagram illustrating the operations in a class loading sequence in a conventional Java environment.

FIG. 6 is a diagram of the class loading sequence in a typical Java implementation. The load is initiated as illustrated by block 102 whenever the execution of a Java program explicitly or implicitly requests that a new class be loaded. This request is directed at a class loader component 104 that is, in effect, the "central clearinghouse" for all class loading operations, and that keeps track of all loaded classes.

Assuming that the requested class is not found to be already loaded, Class Loader 104 first sends a read request to the file system of the platform on which the Java Virtual Machine is implemented, represented by the "read request" path to class file 106. The name of the class is mapped to the name of file 106 in the file system using defined conventions and a list of directories ("CLASSPATH") in which class files are expected to be found. If the file system finds the correct file, it returns it to the class loader.

Class loader 104 reads the file and converts it into an internal representation 108 that can be understood by other components of the Java Virtual Machine. During this conversion, some aspects of the file are checked to assure that the file appears to be a valid Java class file.

Once this internal representation of the class file has been created, a verifier component 110 operates on the internal representation and does more detailed verification of its contents. This operation is indicated by the passage of "request" and "response" messages between components 104 and 110. The operation of a verifier component in many ways resembles the operation of a "theorem prover" program as used in other fields of computer science. The purpose of the verifier component is to determine before execution of methods in the class begins that those methods adhere to certain constraints of the Java language. If this is assured, then fewer runtime checks are required to assure that the executable code in a Java class adheres to all the constraints of the Java language.

After internal representation 108 of the class file has been verified, it is then eligible to be "interpreted" by a program interpreter component 112 of the JVM. For simple JVM implementations, this interpretation is equivalent to executing the program code in the Java class.

In some more sophisticated JVM implementations, the interpretable code ("bytecode") portion of internal class file representation 108 may be further processed by a "Just In Time" (JIT) compiler component 114 into native executable program code 116 that is directly executable on the host hardware. Such conversion is commonly referred to as "Just In Time" compilation since it occurs very late in the processing of the Java class—essentially at the last possible moment before the code needs to be executed.

Figure 7:
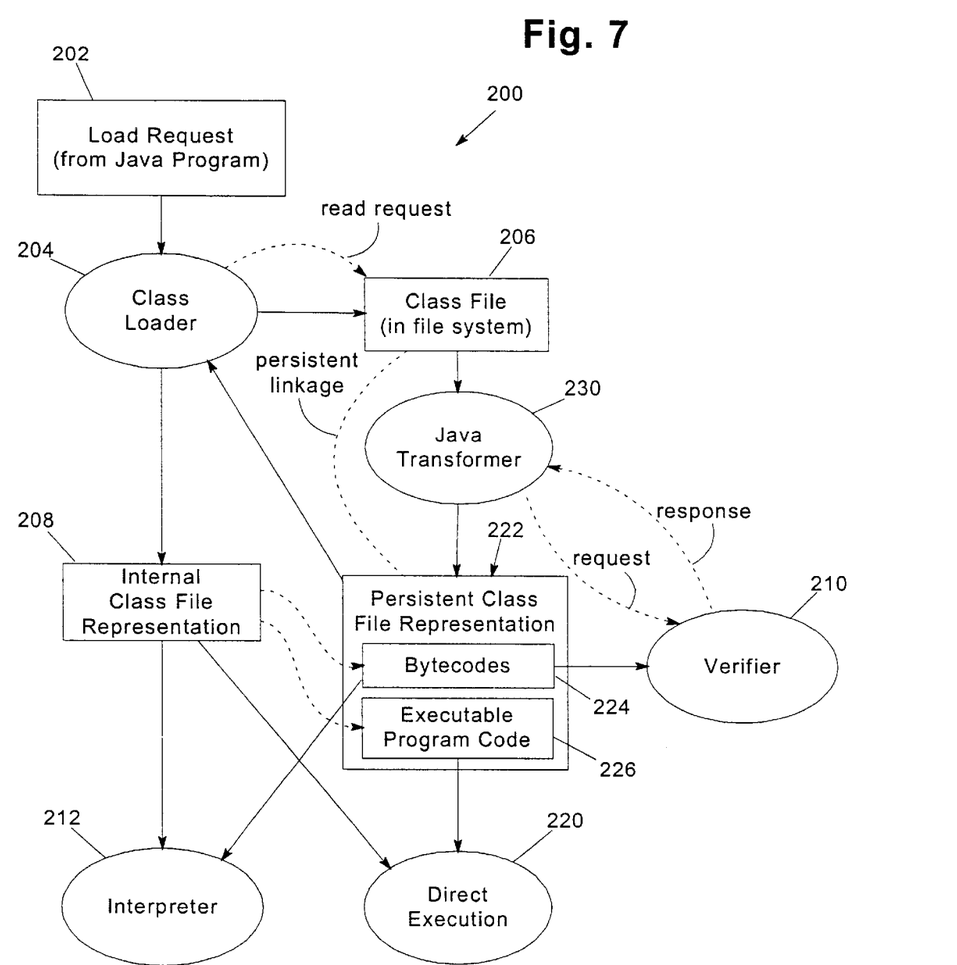
FIG. 7 is an object diagram illustrating the operations in a class loading sequence consistent with the invention.

Now turning to one preferred Java implementation of the invention, FIG. 7 is a diagram of a class loading sequence consistent with the present invention. As with a conventional Java class loading sequence, a load is initiated by an implicit or explicit request from an executing Java program, represented by the presentation of load request 202 to class loader component 204. As before, class loader component 204 keeps track of already-loaded classes and may determine that the requested class is already available.

If not, a request to find the class file is sent to the file system. Unlike with a conventional JVM, however, the resulting file is not directly converted to an internal representation by class loader component 204, but is instead converted to a persistent representation 222 by a separate Java transformer component 230. It is within component 230 a process similar to routine 70 of FIG. 4 is performed, with the exception of actually executing the program code—a process handled by component 220 discussed below. Moreover, in this implementation it may be desirable to omit a decision on whether to generate alternate program code (e.g., as in block 90 of routine 70) such that alternate program code is always generated when no such program code exists. Specifically, it is often desirable to always generate a persistent representation to provide a single consistent view of the program to the JVM. If it is not desirable or possible to generate native program code, the persistent representation may include only a direct or reorganized copy of the original class file and a small amount of "glue code" created to allow interoperability with native methods and with alternate program code from other classes. It may also be desirable to provide a global prerequisite that is set via a configuration setting and/or a command line flag that dictates that all program code be interpreted in lieu of generating and/or executing native program code.

Persistent representation 222 bears some resemblance to the internal representation of the conventional JVM, e.g., the format of the persistent representation is "internal" in the sense that it is known only to components of the JVM. The persistent representation also includes the interpretable program code, or bytecodes 224, that represent the functionality of the class. As with a conventional JVM, the class may also be verified at this time using a verifier component 210 as discussed above.

The persistent representation, however, differs from an internal representation in several aspects. First, the persistent representation is "persistent", meaning that it exists in storage that is preserved by the host computer system even after the JVM completes execution, and, in most cases, is preserved even if the host computer system is shut down and power is removed from it for a time.

Second, a persistent linkage, or association, is established between persistent representation 222 and class file 206, so that if the class file is later found (e.g., by another JVM instance), then the previously-created persistent representation can also be found. This is typically accomplished via setting a file attribute in class file 206 to point to the address of persistent representation 222, or in any other manner described above for associating alternate program code with a primary program code file.

Third, at the time that persistent representation 222 is created and verified, native executable code 226 may optionally be created and stored in the persistent representation in the general manner discussed above to implement the function of the interpretable code in a native format. Unlike Just In Time compilation, however, this executable code may be made a part of the persistent representation and hence, preserved from one instance of a JVM to the next.

Once persistent representation 222 is created and processed as described above, this persistent representation is made available to class loader component 204. The class loader component then creates an internal representation 208 from the persistent representation. However, unlike a conventional JVM, the internal representation need not directly contain the interpretable code of the class, since, on computer systems (e.g., the AS/400 computer system) where persistent storage can be mapped to program-addressable memory, the internal representation can simply refer to the interpretable code 224 in persistent representation 222. Thus, if interpretation is performed (e.g., with interpreter component 212), it may be performed by directly referencing the interpretable code in the persistent representation, thereby avoiding the need to make a copy.

If it is desired to use a representation of the program code that is directly executable on the host computer system, the Just In Time compilation step is bypassed (since executable representation 226 already exists) and, where the design of the host computer system permits, the executable program code 226 in the persistent representation 222 is directly executed as represented by direct execution component 220. Typically, the program code is copied and executed just as executable code is copied from file to program addressable memory in a conventional program loading operation for a conventional executable language. The load request for the Java class file is then complete.

Figure 8:
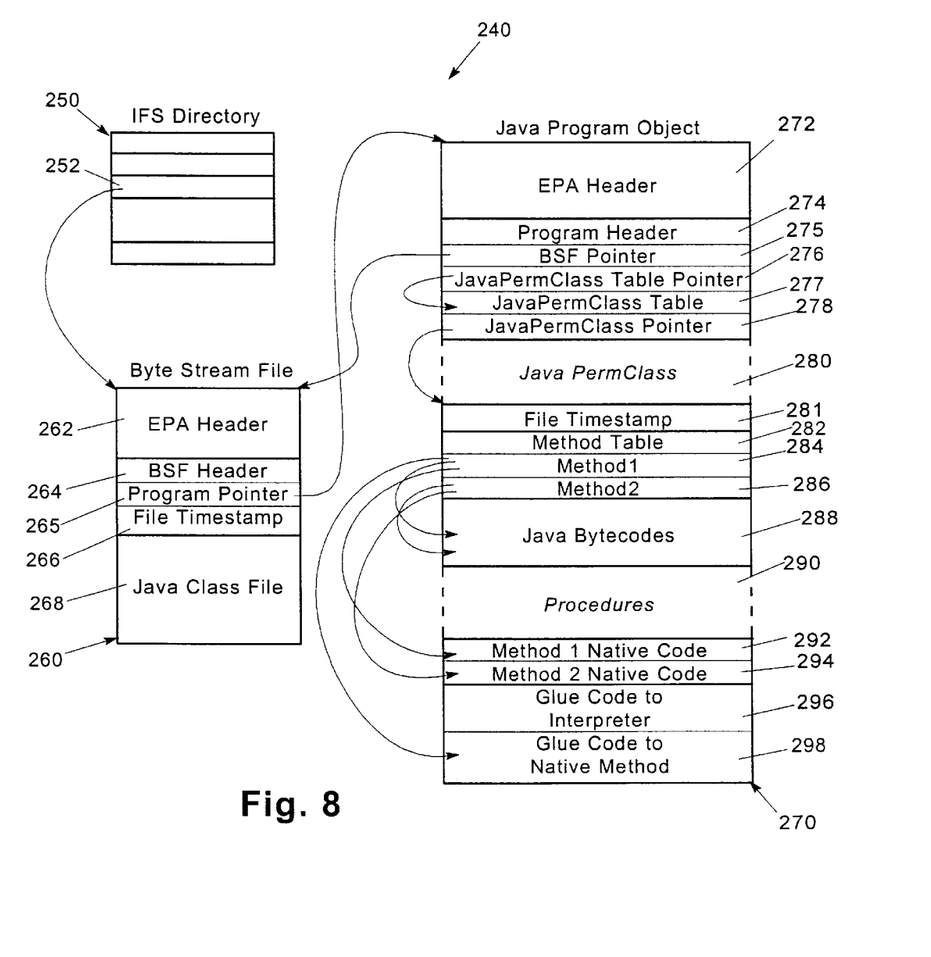
FIG. 8 is a block diagram of the persistent class file representation shown in FIG. 7.

FIG. 8 illustrates one manner of implementing a persistent representation of a class file in an AS/400 computer system or the like, and in a manner consistent with the invention. The persistent representation is maintained in a Java program object 270. A conventional file system 240 is represented by the integrated file system (IFS) directory 250, with a byte stream file 260 (BSF) referenced in directory 250 by entry 252. In this case, byte stream file 260 and Java program object 270 are AS/400 objects within the storage system of an AS/400 computer system. The AS/400 storage system supports both persistent and non-persistent objects, and objects 260, 270 are presumed to be persistent ones. IFS directory entry 252 is a piece of data in another AS/400 object, that object being persistent directory 250 that is used to locate other objects.

The file contents of BSF 260 include the Java class file data 268, formatted in the same representation as illustrated in FIG. 5. As will become apparent below, other than the inclusion of a file attribute pointing to the persistent representation, BSF 260 is identical to the normal representation of a Java class file in the file system.

In this implementation, objects 260, 270 each contain file attribute information represented by the "EPA header" sections 262, 272, the "BSF header" section 264, and the "Program header" section 274 of the objects 260, 270. The "EPA header" sections 262, 272 contain file attributes of a general nature that are common for all objects in the system. The "BSF header" and "Program header" sections 264, 274 contain file attributes that are unique to the type of object that contains them. A "program pointer" file. attribute 265, including a pointer to Java program object 270, is unique to objects of type "byte stream file" and is defined in the type-specific file attribute section 264. Similarly, an optional "BSF pointer" file attribute 276, including a pointer to byte stream file 260, is maintained in the type-specific attribute section 274 of Java program object 270.

It should be appreciated that Java program object 270 is not shown as pointed to by an entry in IFS directory 250, meaning that the object does not have a nameable location within the file system. In the alternative, however, the object may have such an entry, and thus, may be nameable within the file system. In addition, it should also be appreciated that the file attributes used to link the objects together need not be implemented as physical sections of the objects themselves, but may also be implemented via file attributes stored in the file system directory, such as the extended attributes supported by the OS/2 operation system, among others. In this latter case, the file attributes may link between objects by object name, rather than by using pointers, thereby accomplishing the same effective linage.

The main portion of the persistent representation of the Java class is included in a "JavaPermClass" section 280. This section includes internal representations of all of the data structures within the original Java class file (or at least those data structures for which it is useful to preserve), e.g., in the Java bytecodes portion 288 of procedures section 290. Within this representation is a "method table" 282 that contains entries (e.g., entries 284, 286) to represent each of the methods within the class. Within these entries are pointers to the actual interpretable program code (represented by Java bytecodes portion 288) and, optionally, executable program code portions for the associated methods (e.g., native method program code 292, 294). In this implementation there may also be "glue code" for some methods, i.e., program code that can be interposed between interpretable and directly executable methods to map the parameters bach and forth (e.g., glue code 296, 298).

It should also be appreciated that, within both objects 260, 270, there is a "file timestamp" file attribute 266, 281 that represents the most recent modification time of byte stream file object 260. When a class file is first located within the file system and is interrogated to see if a Java program object 270 is attached, the two file timestamps are compared to determine if the Java program object represents the most recent modification of the byte stream file. If not, the Java program object is regenerated in the manner discussed above. Other manners of detecting whether a Java program object is current may be used, e.g., a flag in the byte stream file object that is turned on every time the file is modified and then subsequently turned off when the Java program object is generated or regenerated, or version identifiers for both objects 260, 270 that are compared to determine whether a Java program object is current.

It should further be appreciated that the above-described implementation may also be extended for the case where the byte stream file object includes not a single Java class file, but rather a group of Java class files in a Java Archive (JAR) format. In this case, the Java program object may include a table or directory 277 of JavaPermClass pointers 278 so that one of a multiplicity of persistent representations of Java classes may be located. It may also be desirable to include a pointer 276 to the table itself within header 274. Once the desired particular persistent representation is located, the class loader components may operate on that individual persistent representation, regardless of how many other such persistent representations may be present in the object. However, in an implementation in which only one Java class file is stored in a persistent representation, a separate table 277 and its associated pointers 276, 278 may be omitted from object 270.

The above-described implementations may provide a number of unique advantages. First, by preserving the alternate program code from one use to the next, the overall frequency of generation is greatly reduced. For example, with a Java implementation, the overall frequency of compilation is reduced, thereby permitting a more sophisticated compiler to be used—often producing better code, especially for difficult-to-compile-to RISC architectures.

Also, by performing the generation of alternate program code as an intrinsic part of a load operation (e.g., for Java, during a class load operation), rather than requiring explicit generation (e.g., pre-compilation), the benefits of the operation are made more readily available to a larger range of users. In addition, no explicit management of the alternate program code is required separate of the primary program code. Also, the integrity of the coupling of the primary and alternate program code may be automatically maintained (e.g., via timestamps, checksums, other file attributes, etc.) to further reduce any explicit management requirements.

Moreover, by using file attributes rather than a "fat" file, it becomes possible to make the generation of alternate program code automatic and still preserve the generated code from one use to the next. The file attributes are hidden from normal file input/output operations, whereby the alternate program code is more transparent to a user or conventional file execution module such as a Java interpreter. Data security is also improved since typically no write access to the primary program code file is necessary to perform the association, thereby permitting a primary program code file to be maintained as a read-only file. Also, the access controls to the primary and alternate program code may be maintained separately, since access to the alternate program code may be limited to the file system itself.

Furthermore, by performing the generation of alternate program code prior to loading the primary program code file (e.g., prior to loading a Java class file), it is possible for the system to perform validation operations that would otherwise need to be performed during loading and initialization of the primary program code. Particularly with languages such as Java, validation can be a relatively complex and computationally-expensive process, and since a compiler often needs to generate many of the same structures that a verifier would need, pre-performing this validation can be of benefit, especially if the system restricts access to file attributes so that the attributes may be "trusted" to correctly represent the validation status of the primary program code file.

Various additional modifications may be made to the above-described embodiments without departing from the spirit and scope of the invention. Therefore, the invention lies solely in the claims hereinafter appended.

What is claimed is:

1. A method of retrieving a program for execution on a computer system, the program stored in a file on the computer system and including a first set of program code, the method comprising:
   (a) retrieving the file;
   (b) generating a second set of program code from the first set of program code; and
   (c) associating the second set of program code with the file using a file attribute.

2. The method of claim 1, wherein retrieving the file includes loading the file from a file system.

3. The method of claim 1, further comprising executing the second set of program code on the computer system.

4. The method of claim 1, wherein generating the second set of program code includes compiling the first set of program code.

5. The method of claim 1, wherein each of the first and second sets of program code is selected from the group consisting of source code, script code, intermediate code, object code, and combinations thereof.

6. The method of claim 1, wherein the first set of program code is platform-independent, and wherein the second set of program code is native to the computer system.

7. The method of claim 6, wherein the first set of program code includes a set of Java bytecodes, and wherein the second set of program code includes native program code compiled from the set of Java bytecodes.

8. The method of claim 7, wherein the file is a Java class file.

9. The method of claim 7, wherein the file is a Java archive (JAR) file.

10. The method of claim 1, wherein the file attribute is stored in a header portion of the file.

11. The method of claim 10, wherein the second set of program code is stored in the header portion of the file.

12. The method of claim 1, wherein the second set of program code is stored in a second file, and wherein the file attribute includes a reference to the second file.

13. The method of claim 1, wherein the file attribute is hidden from file input/output operations performed in the computer system.

14. The method of claim 1, wherein the file attribute is modifiable only by a file management system in the computer system.

15. The method of claim 1, further comprising separately controlling file access rights to the first and second sets of program code.

16. The method of claim 1, further comprising storing a prerequisite associated with the second set of program code, the prerequisite defining at least one condition that must be met for the second set of program code to be executed.

17. The method of claim 1, further comprising storing a revision status for the second set of program code.

18. A method of retrieving a program for execution on a computer system, the program stored in a file on the computer system and including a first set of program code, the method comprising:
   (a) analyzing a file attribute for the file to detect existence of a second set of program code that is an alternate representation of the first set of program code; and
   (b) if the second set of program code exists, retrieving the second set of program code.

19. The method of claim 18, further comprising determining a revision status of the second set of program code, wherein retrieving the second set of program code is performed only if the revision status of the second set of program code matches that of the first set of program code.

20. The method of claim 19, wherein determining the revision status includes analyzing first and second timestamps associated respectively with the first and second sets of program code.

21. The method of claim 19, wherein determining the revision status includes analyzing first and second checksums associated respectively with the first and second sets of program code.

22. The method of claim 19, wherein determining the revision status includes analyzing an update attribute associated with at least one of the first and second sets of program code, the method further comprising placing the update attribute in a first state whenever the first set of program code is modified, and placing the update attribute in a second state whenever the second set of program code is updated to incorporate modifications to the first set of program code.

23. The method of claim 18, further comprising analyzing at least one prerequisite associated with the second set of program code, wherein retrieving the second set of program code is performed only if the prerequisite is met.

24. The method of claim 18, further comprising:
   (a) generating a third set of program code from the first set of program code;and
   (b) associating the third set of program code with the file using a file attribute.

25. The method of claim 24, wherein generating the third set of program code is performed in response to at least one of a determination that a revision status of the second set of program code does not match that of the first set of program code, and a determination that a prerequisite associated with the second set of program code is not met.

26. The method of claim 18, further comprising executing the second set of program code on the computer system.

27. The method of claim 18, wherein each of the first and second sets of program code is selected from the group consisting of source code, script code, intermediate code, object code, and combinations thereof.

28. The method of claim 18, wherein the first set of program code is platform-independent, and wherein the second set of program code is native to the computer system.

29. The method of claim 28, wherein the first set of program code includes a set of Java bytecodes, and wherein the second set of program code includes native program code compiled from the set of Java bytecodes.

30. The method of claim 29, wherein the file is a Java class file.

31. The method of claim 29, wherein the file is a Java archive (JAR) file.

32. The method of claim 18, wherein the file attribute is stored in a header portion of the file.

33. The method of claim 32, wherein the second set of program code is stored in the header portion of the file.

34. The method of claim 18, wherein the second set of program code is stored in a second file, and wherein the file attribute includes a reference to the second file.

35. The method of claim 18, wherein the file attribute is hidden from file input/output operations performed in the computer system.

36. The method of claim 18, wherein the file attribute is modifiable only by a file management system in the computer system.

37. The method of claim 18, further comprising separately controlling file access rights to the first and second sets of program code.

38. A method of optimizing execution of a program on a computer system, the program stored in a file on the computer system and including a first set of program code, the method comprising:
 (a) analyzing a file attribute for the file to detect existence of a second set of program code that is an alternate representation of the first set of program code;
 (b) if the second set of program code exists, retrieving and executing the second set of program code; and
 (c) if the second set of program code does not exist:
  (1) generating the second set of program code from the first set of program code;
  (2) associating the second set of program code with the file using a file attribute; and
  (3) executing the second set of compiled program code.

39. The method of claim 38, wherein the first set of program code includes Java bytecodes stored in a Java class file, wherein the file attribute includes a reference to a second file stored in the computer system, and wherein the second set of program code is stored in the second file and includes a compiled representation of the Java bytecodes that is native to the computer system.

40. A computer system, comprising:
 (a) a file system configured to store at least one file; and
 (b) a processor, coupled to the file system, the processor configured to receive a file that includes a first set of program code and to generate a second set of program code from the first set of program code, the processor further configured to store the second set of program code in the file system with the second set of program code associated with the file using a file attribute for the file.

41. The computer system of claim 40, wherein the processor is further configured to execute the second set of program code on the computer system.

42. The computer system of claim 40, wherein the processor is further configured to compile the first set of program code to generate the first set of program code.

43. The computer system of claim 40, wherein each of the first and second sets of program code is selected from the group consisting of source code, script code, intermediate code, object code, and combinations thereof.

44. The computer system of claim 40, wherein the first set of program code is platform-independent, and wherein the second set of program code is native to the computer system.

45. The computer system of claim 44, wherein the first set of program code includes a set of Java bytecodes, and wherein the second set of program code includes native program code compiled from the set of Java bytecodes.

46. The computer system of claim 40, wherein the file attribute is stored in a header portion of the file.

47. The computer system of claim 46, wherein the second set of program code is stored in the header portion of the file.

48. The computer system of claim 40, wherein the second set of program code is stored in a second file, and wherein the file attribute includes a reference to the second file.

49. The computer system of claim 40, wherein the second set of program code includes a prerequisite associated therewith, the prerequisite defining at least one condition that must be met for the second set of program code to be executed.

50. The computer system of claim 40, wherein the second set of program code includes a revision status associated therewith.

51. A computer system, comprising:
 (a) a memory; and
 (b) a processor, coupled to the memory, the processor configured to detect existence of a second set of program code that is an alternate representation of a first set of program code in a file by analyzing a file attribute of the file, and to retrieve into the memory the second set of program code if the second set of program code is detected.

52. The computer system of claim 51, wherein the processor is further configured to determine a revision status of the second set of program code, and in response thereto, to retrieve the second set of program code only if the revision status of the second set of program code matches that of the first set of program code.

53. The computer system of claim 52, wherein the processor utilizes at least one of a timestamp, a checksum, and an update attribute in determining the revision status of the second set of program code.

54. The computer system of claim 51, wherein the processor is further configured to analyze at least one prerequisite associated with the second set of program code, and in response thereto, to retrieve the second set of program code only if the prerequisite is met.

55. The computer system of claim 51, wherein the processor is further configured to generate a third set of program code from the first set of program code, and to associate the third set of program code with the file using a file attribute.

56. The computer system of claim 55, wherein the processor is further configured to generate the third set of program code in response to at least one of a determination that a revision status of the second set of program code does not match that of the first set of program code, and a determination that a prerequisite associated with the second set of program code is not met.

57. The computer system of claim 51, wherein the processor is further configured to execute the second set of program code.

58. The computer system of claim 51, wherein each of the first and second sets of program code is selected from the group consisting of source code, script code, intermediate code, object code, and combinations thereof.

59. The computer system of claim 51, wherein the first set of program code is platform-independent, and wherein the second set of program code is native to the computer system.

60. The computer system of claim 59, wherein the first set of program code includes a set of Java bytecodes, and wherein the second set of program code includes native program code compiled from the set of Java bytecodes.

61. The computer system of claim 51, wherein the file attribute is stored in a header portion of the file.

62. The computer system of claim 61, wherein the second set of program code is stored in the header portion of the file.

63. The computer system of claim 51, wherein the second set of program code is stored in a second file, and wherein the file attribute includes a reference to the second file.

64. A program product, comprising:
   (a) a first program configured to perform a method of retrieving a second program for execution on a computer system, the second program configured to be stored in a file on the computer system and including a first set of program code, the method comprising:
      (1) retrieving the file;
      (2) generating a second set of program code from the first set of program code; and
      (3) associating the second set of program code with the file using a file attribute; and
   (b) a signal bearing media bearing the program.

65. The program product of claim 64, wherein the signal bearing media is transmission type media.

66. The program product of claim 64, wherein the signal bearing media is recordable media.

67. A program product, comprising:
   (a) a first program configured to perform a method of retrieving a second program for execution on a computer system, the second program configured to be stored in a file on the computer system and including a first set of program code, the method comprising:
      (1) analyzing a file attribute for the file to detect existence of a second set of program code that is an alternate representation of the first set of program code; and
      (2) if the second set of program code exists, retrieving the second set of program code; and
   (b) a signal bearing media bearing the program.

68. The program product of claim 67, wherein the signal bearing media is transmission type media.

69. The program product of claim 67, wherein the signal bearing media is recordable media.

* * * * *